(12) United States Patent
Sculler et al.

(10) Patent No.: US 8,273,988 B2
(45) Date of Patent: Sep. 25, 2012

(54) CABLE MANAGEMENT SYSTEM

(75) Inventors: Steven J. Sculler, Morganville, NJ (US);
Steven R. Remy, New York, NY (US);
Norman L. Barrigas, Danbury, CT (US)

(73) Assignee: Bell'O International Corp.,
Morganville, NJ (US)

( * ) Notice: Subject to any disclaimer, the term of this patent is extended or adjusted under 35 U.S.C. 154(b) by 14 days.

(21) Appl. No.: 13/049,026

(22) Filed: Mar. 16, 2011

(65) Prior Publication Data
US 2011/0192629 A1 Aug. 11, 2011

Related U.S. Application Data

(63) Continuation of application No. 12/231,330, filed on Sep. 2, 2008, now Pat. No. 7,910,829.

(51) Int. Cl.
*H01B 7/00* (2006.01)
(52) U.S. Cl. ............... 174/72 A; 174/68.1; 174/68.3; 439/211; 248/49
(58) Field of Classification Search ............ 174/72 A, 174/68.1, 68.3, 101; 439/211; 248/49, 68.1; 138/108
See application file for complete search history.

(56) References Cited

U.S. PATENT DOCUMENTS

| | | |
|---|---|---|
| 3,676,974 A | 7/1972 | Daly |
| 3,721,762 A | 3/1973 | Gooding |
| 3,786,171 A | 1/1974 | Shira |
| 4,017,137 A | 4/1977 | Parks |
| 4,037,900 A | 7/1977 | Schmidger |
| 4,244,083 A | 1/1981 | Aremka et al. |
| 4,360,705 A | 11/1982 | Rogers |
| 4,882,453 A | 11/1989 | Chelsea |
| 5,274,972 A | 1/1994 | Hansen et al. |
| 5,304,736 A | 4/1994 | Halfacre |
| 5,357,053 A | 10/1994 | Manaras et al. |
| 5,403,974 A | 4/1995 | Leach et al. |
| 5,406,762 A | 4/1995 | Buard |
| 5,523,529 A | 6/1996 | Holliday |
| 5,732,747 A | 3/1998 | Holliday |
| 5,753,855 A | 5/1998 | Nicoli et al. |
| 5,777,266 A * | 7/1998 | Herman et al. ............ 174/68.1 |
| 6,202,380 B1 | 3/2001 | Trutwin et al. |
| 6,233,791 B1 | 5/2001 | Theis |
| 6,881,083 B2 | 4/2005 | Vargas et al. |
| 7,038,133 B2 | 5/2006 | Arai et al. |
| 7,307,217 B2 * | 12/2007 | Daito ...................... 174/72 A |
| 7,434,769 B1 | 10/2008 | May |
| 7,501,576 B2 | 3/2009 | Gagliardi |
| 7,501,580 B2 | 3/2009 | Pagoto et al. |
| 8,124,887 B2 * | 2/2012 | Suzuki ...................... 174/481 |
| 2003/0106702 A1 | 6/2003 | Seamans et al. |
| 2006/0185883 A1 | 8/2006 | Santelli |
| 2007/0111585 A1 | 5/2007 | Mori et al. |
| 2007/0138349 A1 | 6/2007 | Ayoub |
| 2008/0011512 A1 | 1/2008 | Burns |

* cited by examiner

*Primary Examiner* — Dhirubhai R Patel
(74) *Attorney, Agent, or Firm* — Lerner, David, Littenberg, Krumholz & Mentlik, LLP

(57) ABSTRACT

A cable management system includes track units whose tracks are engageable to each other at longitudinal ends to ease installation of the tracks to a wall surface as a chain of longitudinally aligned tracks. The system also includes an adjustable track unit whose longitudinal length can be varied, so that a desired length of longitudinally aligned track units can be obtained without cutting a track unit of the system. In addition, the system includes a cap attachable at an end of a track unit for strengthening the engagement between the cover and the track of the track unit.

11 Claims, 18 Drawing Sheets

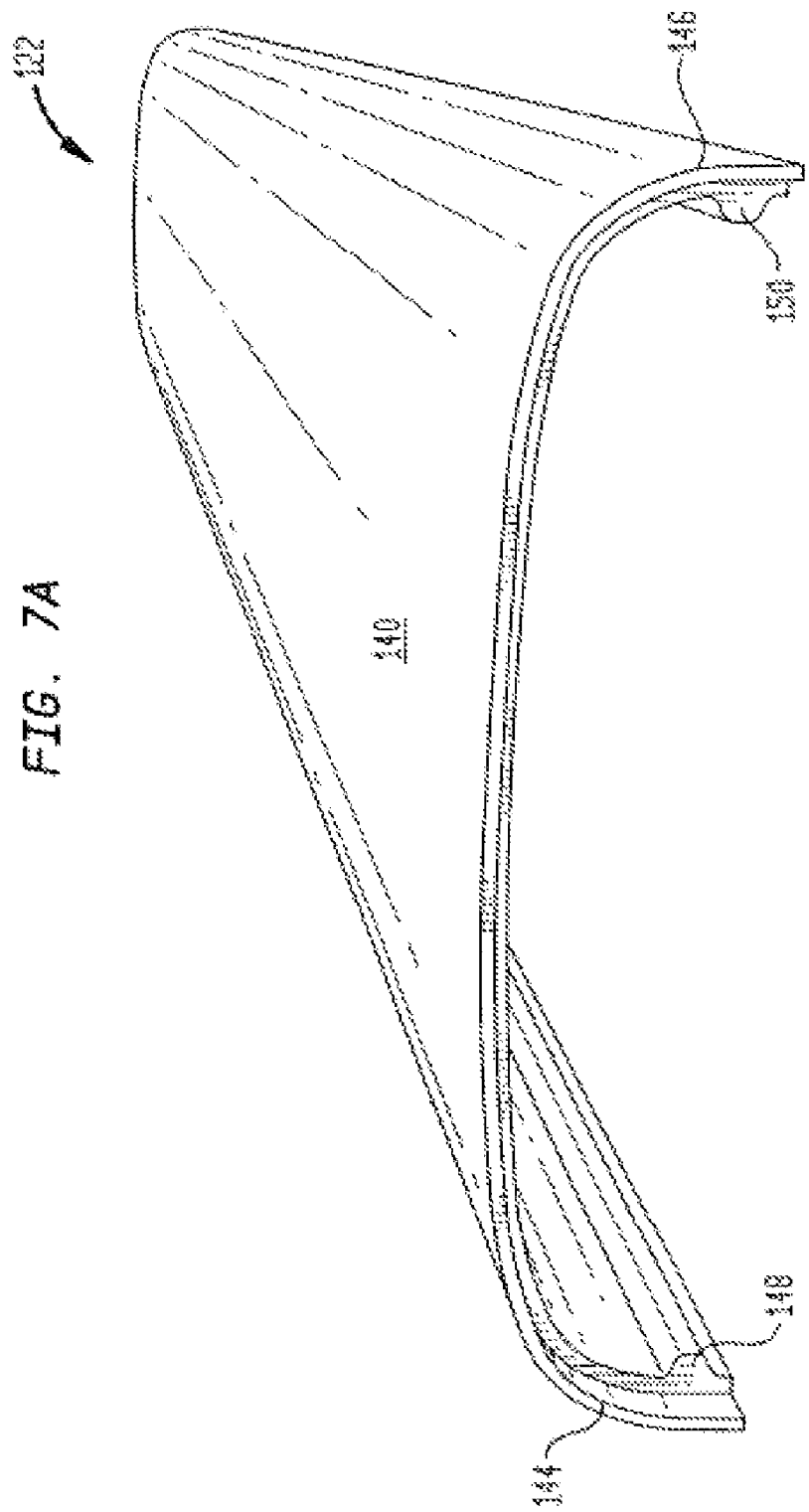

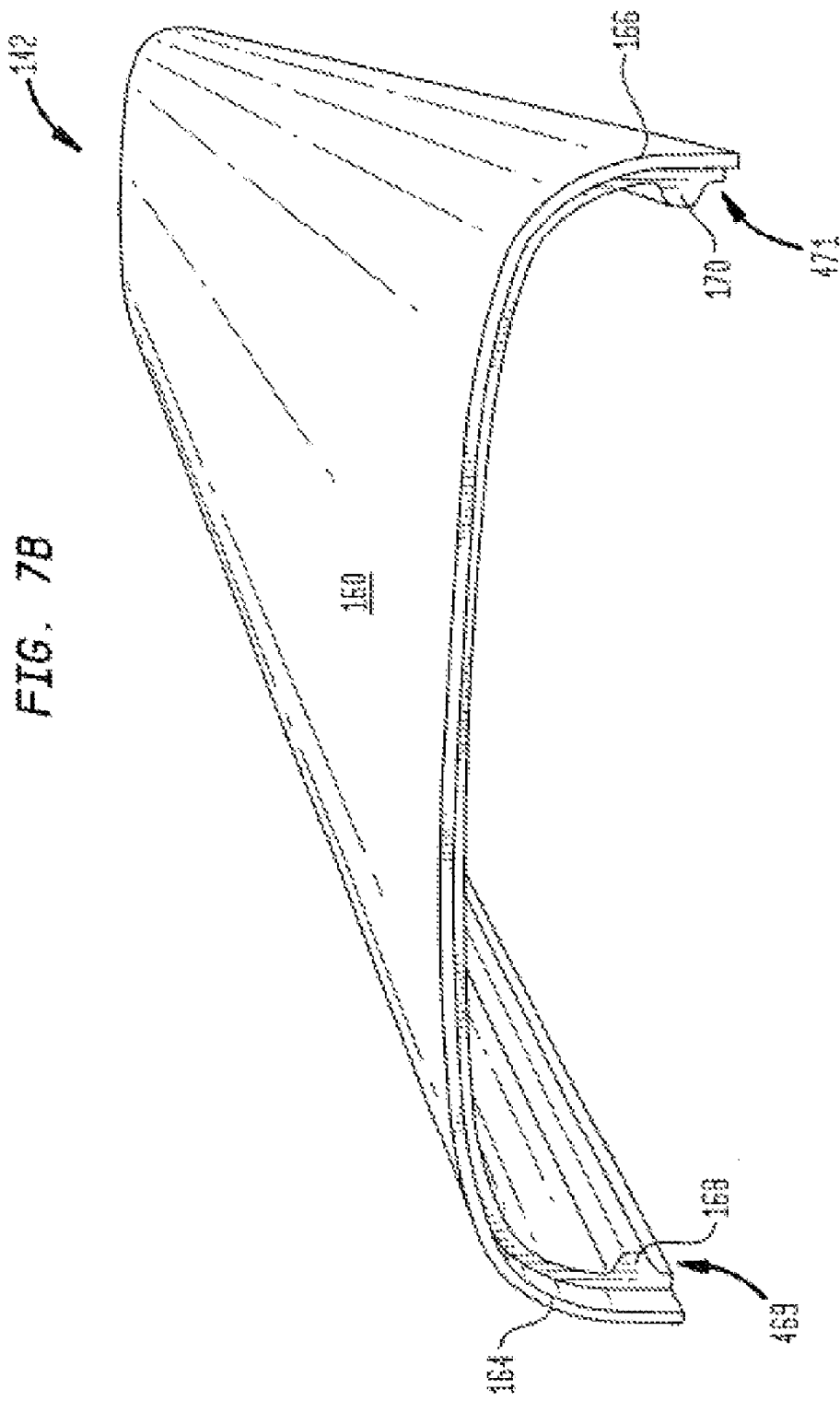

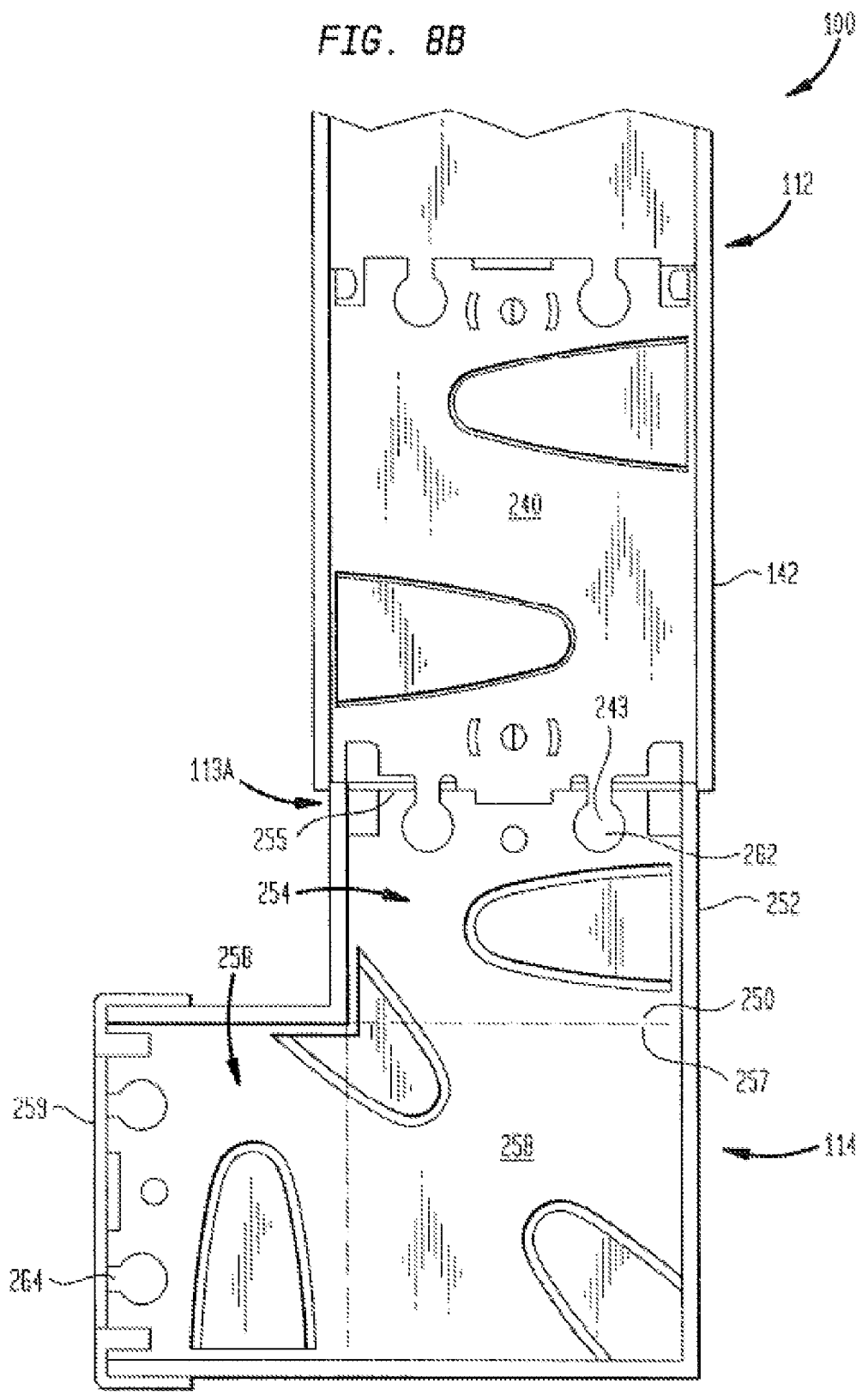

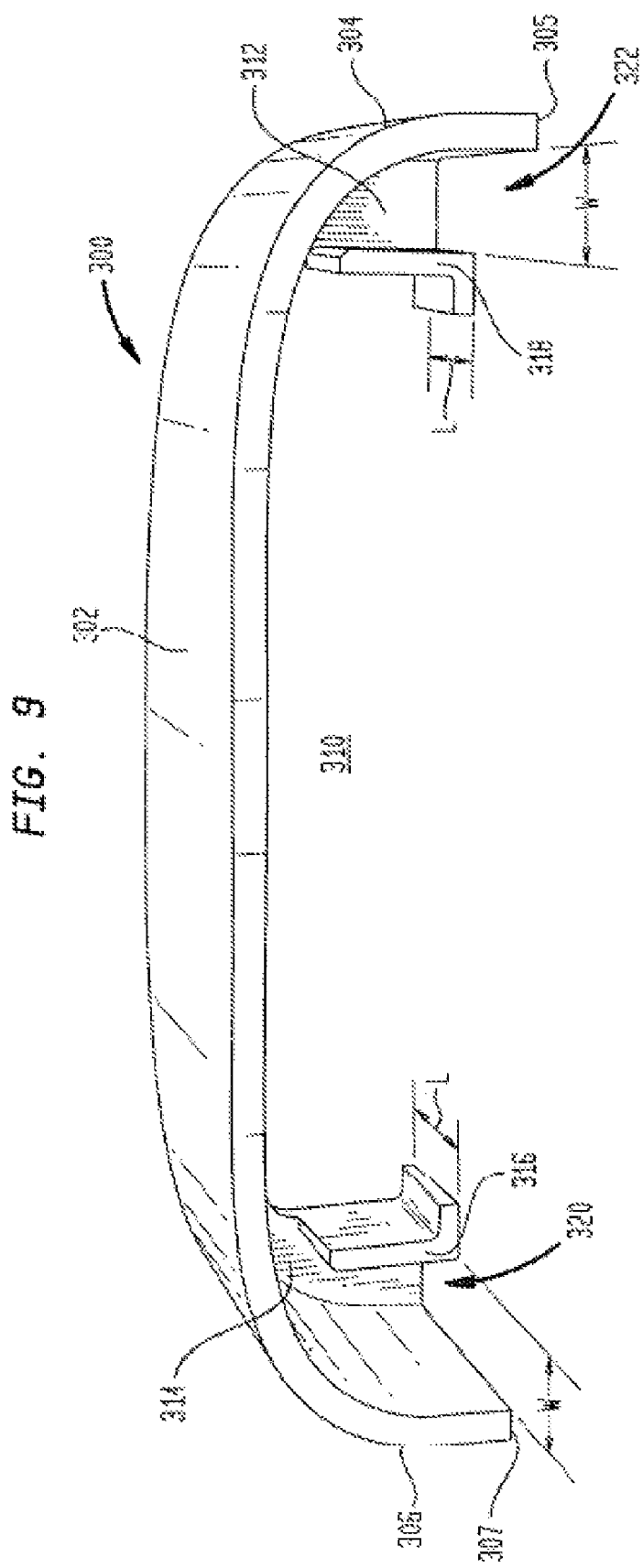

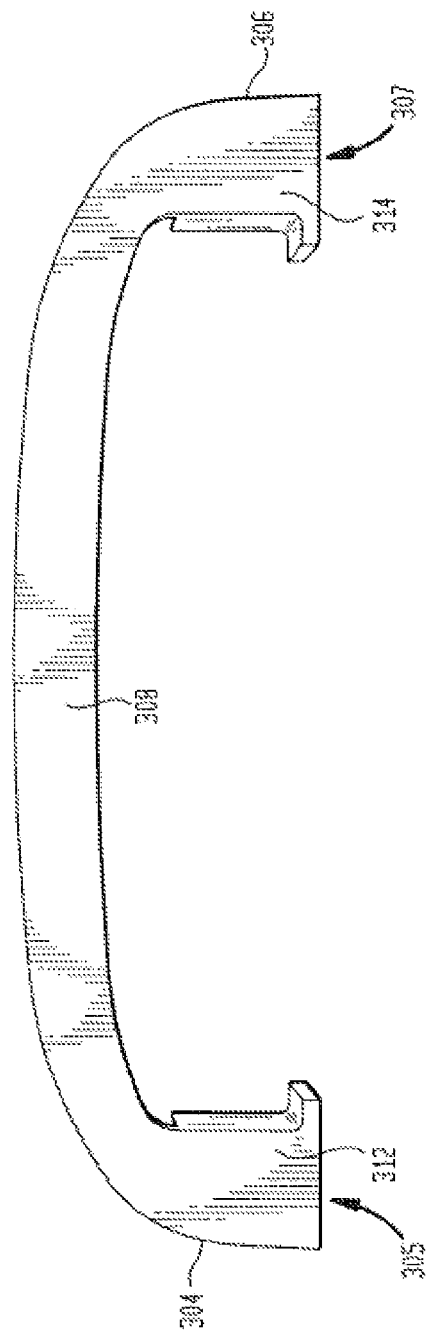
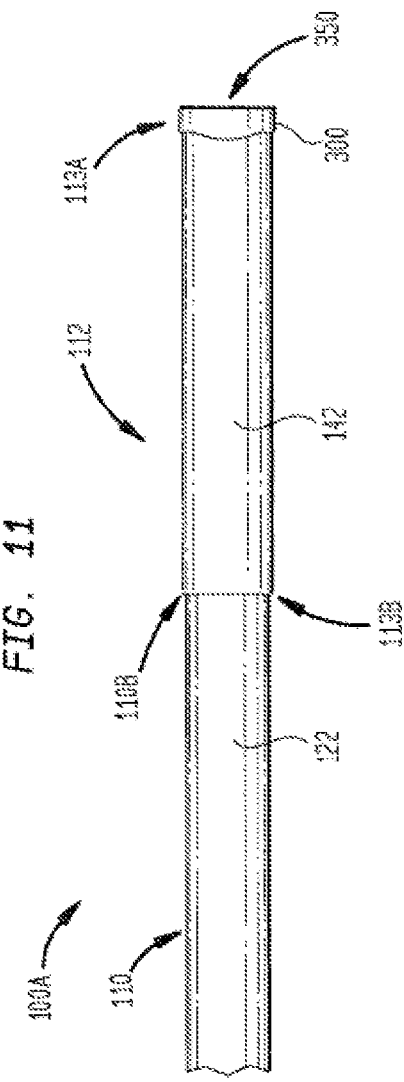

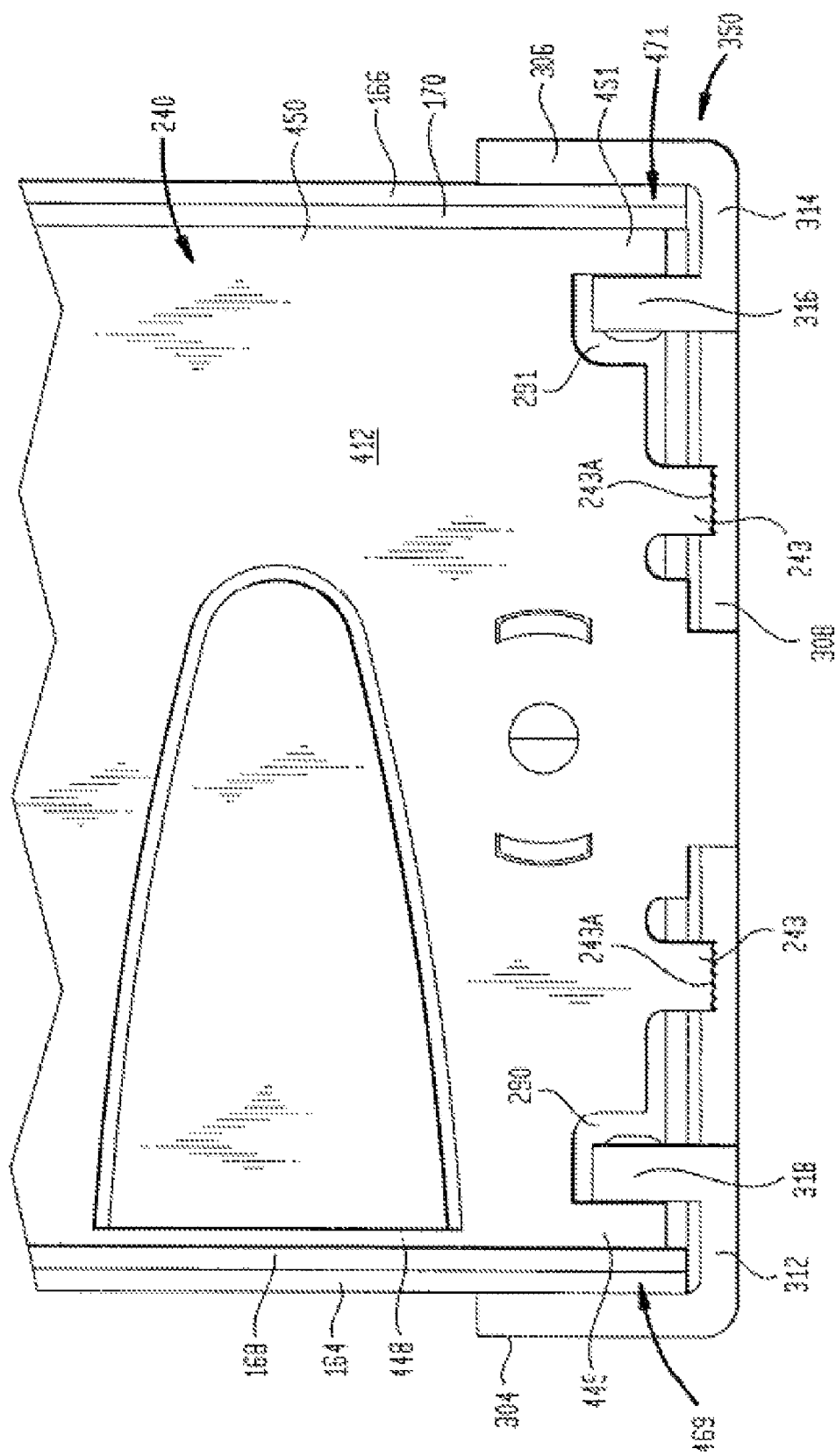

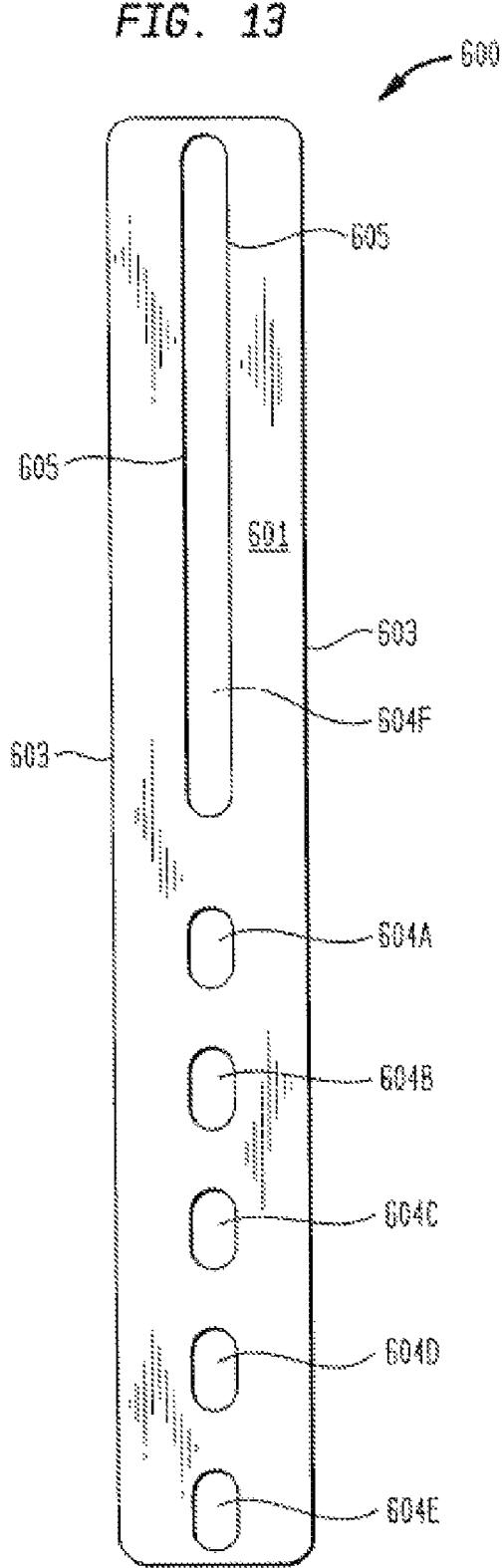

CABLE MANAGEMENT SYSTEM

CROSS-REFERENCE TO RELATED APPLICATION

This application is a continuation of U.S. application Ser. No. 12/231,330, filed on Sep. 2, 2008 now U.S. Pat. No. 7,910,829, the disclosure of which is incorporated herein by reference.

FIELD OF THE INVENTION

The present invention relates generally to a cable management system and, more particularly, to a cable management system including a plurality of track units, each including a track and a corresponding cover, positioned in longitudinal alignment with one another.

BACKGROUND OF THE INVENTION

Various cable management systems have been developed for retaining and aesthetically covering cables or wires (collectively "cables"), such as electrical power wires, audio cables, video cables, etc., when the cables need to be moved from one location to another location. For example, when a flat screen television ("TV") mounted on a vertical wall needs to be connected by a cable to an electrical outlet or an electronic device which is located a vertical distance below the TV, a cable management system is attached to the wall extending between the two locations for retaining the cable and also hiding the cable from view. The covers of track units, from which the cable management system is formed, are designed to blend into the wall, to provide that the system containing the cable(s) is not readily noticeable on the wall.

In the typical cable management system, multiple track units are individually affixed to a wall and positioned end-to-end. It is desired that a track of a track unit, which is to be affixed to a wall, is longitudinally aligned with a track of a track unit already affixed to the wall such that, when the covers are fitted over the respective tracks, the covers and thus the track units form a pleasing looking, longitudinally aligned series of track units. It has been found, however, that a user oftentimes has difficulty affixing a first track to a wall in longitudinal alignment with a preceding second track in the series already affixed to the wall, because the user must hold the first track in longitudinal alignment with the second track while also attempting to affix the first track to the wall, for example, using a screwdriver and screw that would be inserted into an aperture of the first track.

In addition, a user often encounters difficulty installing a cable management system when the desired longitudinal length of the series of track units is not equal to the lengths that can be obtained using the fixed length track units available for use with the cable management system. In such circumstances, the user needs to cut the cover and track of one of the available track units to obtain a series of track units having a desired longitudinal length. The need to cut the track unit requires that suitable cutting tools be available or obtained. In addition, the user needs to be proficient with the use of such cutting tools, so that the cut that is obtained is accurate and precise and also, particularly with respect to the cover, has an aesthetically pleasing outward appearance.

In known cable management systems, the cover of a track unit, when fitted over the corresponding track, becomes engaged to the track. The engagement mechanism, which typically is a snap fit between the track and cover, provides that a user can, without exerting much force, cover the track with the cover after the track has been affixed to a wall surface and cables are retained within the track. Although existing engagement mechanisms provide that a user can easily cover a track with a cover, it has been found that, following engagement, the cover is easily disengaged from the track if the cables being retained by the cable management system are moved. For example, if following installation of the cable management system the cables at an end of the series of track units are pulled during repositioning of the cables, the cables may be caused to move against the cover of a track of a track unit with sufficient force to disengage the cover from the track of such track unit. Disengagement of the cover from the track is undesirable for several reasons. In particular, if the covers of the track units have been painted, the disengagement of the cover from the corresponding track likely will mar an aesthetically pleasing finish obtained by painting of the covers of the track units of the cable management system.

Therefore, there exists a need for a cable management system having track units that can be easily longitudinally aligned with one another and configured to obtain any desired longitudinal length. In addition, there exists need for enhancing the engagement between the cover and the corresponding track of a track unit, after the cover and track have been engaged with each other.

SUMMARY OF TEE INVENTION

In accordance with one aspect of the invention, a cable management system includes first and second longitudinally extending tracks for retaining a cable and adapted for attachment to a surface, wherein the first and second tracks have respective lengths and widths, wherein the length of the first track is larger relative to the length of the second track and wherein the width of the second track is larger than the width of the first track. The system further includes first and second longitudinally extending covers adapted for fitting over and engaging with the first and second tracks, respectively, wherein the first and second covers have respective widths and lengths, wherein the length of the first cover is equal to the length of the first track, wherein the width of the second cover is larger than the width of the first cover and the length of the second cover is larger than the length of the second track. The second cover and the second track are adapted such that, when the second cover is fitted over and engaged with the second track, the second cover is slidable longitudinally in relation to the second track. In addition, the second cover and the first cover are adapted such that, when the first and second tracks are in longitudinal alignment with each other and the first and second covers are fitted over and engaged with the respective first and second tracks, the second cover is slidable longitudinally over at least a first portion of the first cover for simultaneously covering the first portion of the first cover and the entirety of the second track.

In a further embodiment, the cable system includes a third track for retaining a cable and adapted for attachment to a surface, and a third cover for fitting over the entirety of and engaging with the third track. The third track includes first and second longitudinally extending end portions not longitudinally aligned with each other. The first end portion of the third track has a width equal to the width of the first track, and the width of the third cover covering the first end portion of the third track is equal to the width of the first cover. The first, second and third covers are adapted such that, when (i) the first and second tracks are in longitudinal alignment with each other, (ii) the first portion of the third track is in longitudinal alignment with an end of the second track opposing the first track and (iii) the first, second and third covers are fitted over and engaged with the respective first, second and third tracks, the second cover is slidable longitudinally in relation to the second track and over the first cover and the first portion of the third cover for simultaneously covering the entirety of the second cover and at least one of a portion of the first cover or a portion of the first portion of the third cover.

In accordance with another aspect of the invention, a cable management system includes first and second longitudinally extending tracks adapted for attachment to a surface and for retaining a cable, wherein the first track includes an alignment and engagement tab projecting from a first end of the first track and wherein the second track defines a recess at a first end of the second track adapted for mating with the tab of the first track. The system is adapted such that, when the tab of the first track is mated with the recess of the second track, the first track is engaged and longitudinally aligned with the second track and the engagement of the first track with the second track is maintained in the presence of a force acting along the longitudinal length of the first track or the second track. In one embodiment of the system, the tab includes a weakened portion extending transversely to the longitudinal dimension of the first track.

In a further aspect of the invention, a cap is provided for a cable management system, where the cable management system includes a longitudinally extending track and a longitudinally extending cover engageable with and for fitting over the track, wherein the track includes a base with opposing first and second sides, wherein the first side of the base terminates as first and second projections at the longitudinal ends of the track and the second side of the base terminates as third and fourth projections at the longitudinal ends of the track, wherein the cover includes a top with opposing first and second sides, and wherein the first side of the cover terminates at first and second ends at the longitudinal ends of the cover and the second side of the cover terminates as third and fourth ends at the longitudinal ends of the cover. The cap includes a top, a back wall and opposing first and second cap sides extending from the back wall, wherein the top, back wall and opposing cap sides define an interior region. In addition, the cap includes opposing first and second inner tabs extending from the back wall into the interior region and defining first and second track and cover receiving regions with the corresponding opposing first and second cap sides. The first and second receiving regions are adapted for receiving and retaining therein, when the cover is engaged with and fitted over the track, the first end of the cover and the first projection of the track and the third end of the cover and the adjacent third projection of the track, respectively, for strengthening the engagement of the cover with the track.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which:

FIGS. 7A and 7B are perspective views of exemplary covers of the system of FIG. 4.

FIG. 8B is a bottom view of a portion of the system of FIG. 4.

FIG. 9 is a perspective view of a cap in accordance with an aspect of the present invention.

FIG. 10 a front view of the cap of FIG. 9.

FIG. 11 is a perspective view of a portion of an exemplary cable management system in accordance with another aspect of the invention.

FIG. 12 is a bottom view of a portion of the system of FIG. 11.

FIG. 13 is a front view of an alignment template in accordance with an aspect of the invention.

DETAILED DESCRIPTION

Figure 1:
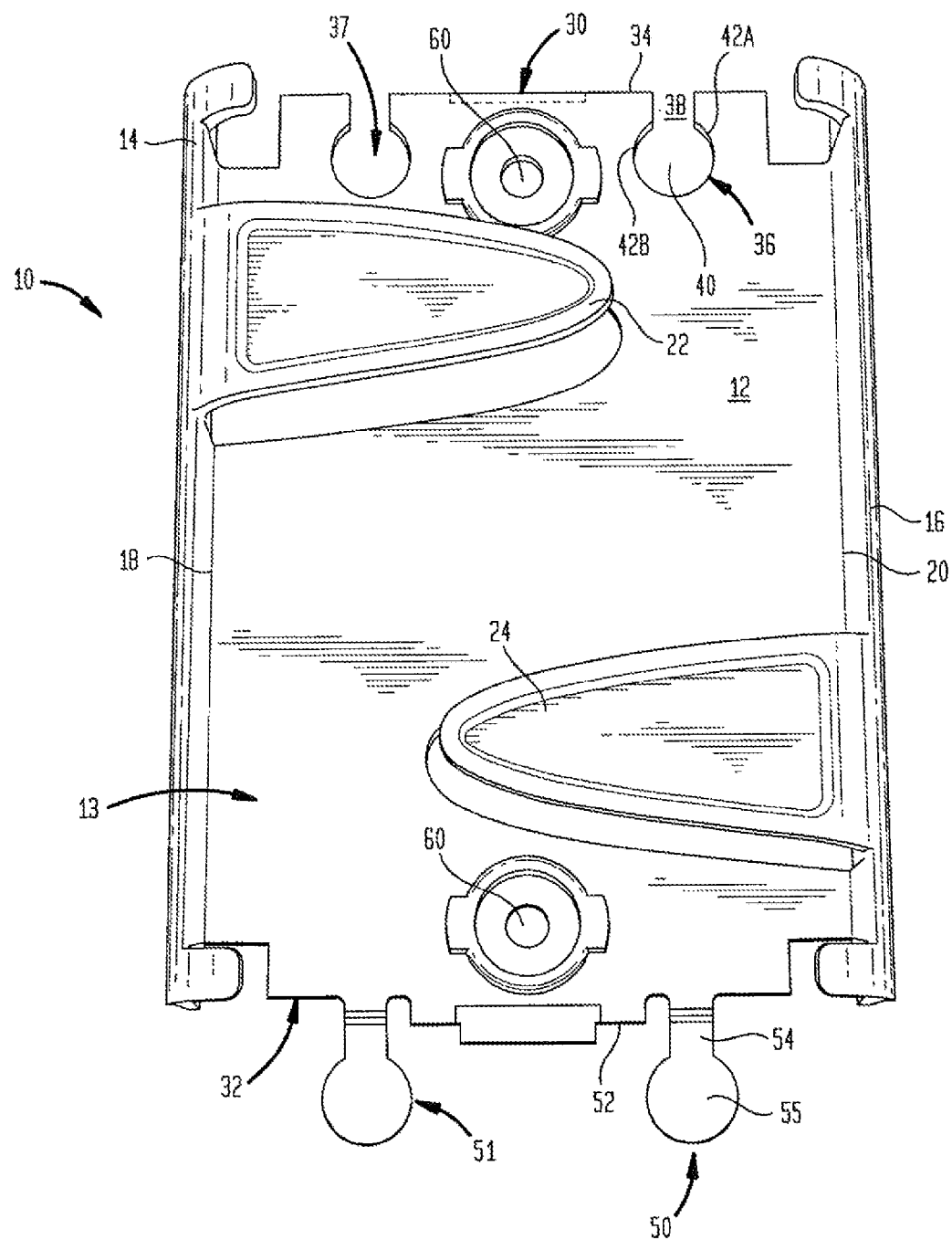
FIG. 1 is a front perspective view of an exemplary track adapted to hold cables in accordance with an aspect of the present invention.
Figure 3:
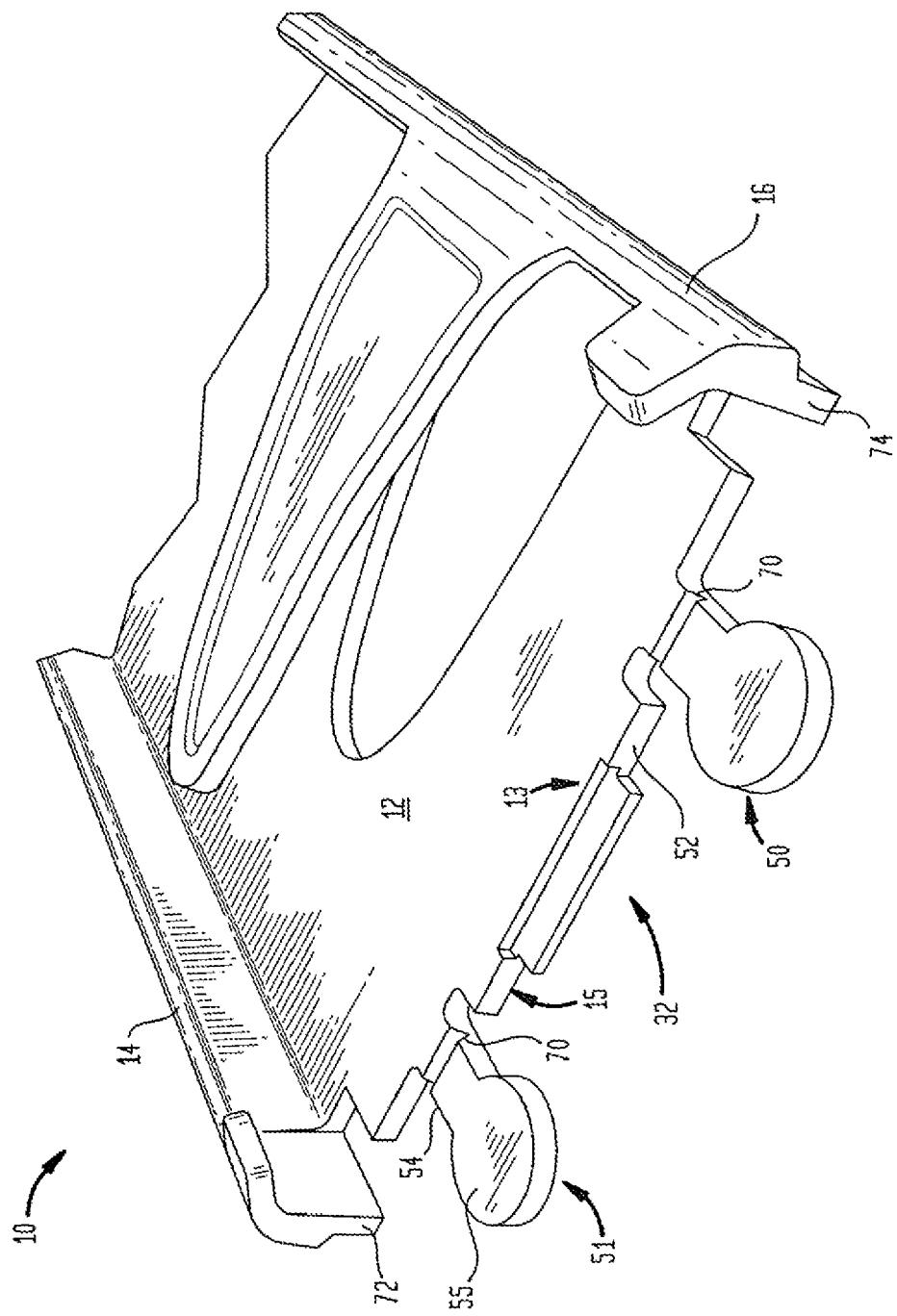
FIG. 3 is a side perspective view of the track of FIG. 1.

FIGS. 1 and 3 illustrate an exemplary longitudinally extending track 10 for retaining cables, in accordance with an aspect of the present invention. The track 10 includes a base 12 in the form of a planar member having a front surface 13, a back surface 15 and parallel opposing sides 14 and 16 extending from the base 12. For ease in describing the features of the inventive track 10, reference is made to a longitudinal dimension of the track 10, which extends between a first or top end 30 and a second or bottom end 32 of the track 10, and a transverse dimension of the track 10, which extends between and is orthogonal to the sides 14 and 16. Hence, a width for the track 10 is defined by a measurement of a distance along the transverse dimension, and a length for the track 10 is defined by a measurement of a distance along the longitudinal dimension. Accordingly, the transverse distance between the sides 14 and 16 defines the width of the track 10, and the longitudinal distance between the ends 30 and 32 defines the length of the track 10. The sides 14, 16, at the top and bottom ends 30, 32 of the track 10 terminate at end surfaces 72, 74, respectively, aligned in the transverse dimension of the track 10.

Referring to FIG. 1, inner edge 18 of the side 14 includes a cable retention tab 22, and inner edge 20 of the side 16 includes a cable retention tab 24. The tab 22 on the edge 18 is spaced longitudinally along the length of the track 10 from the tab 24 on the edge 20. Desirably, the track 10 includes a plurality of tabs 22, 24 disposed alternately along the longitudinal length of the track 10.

Still referring to FIG. 1, the top end 30 includes a transversely extending end surface 34. The end surface 34 desirably is perpendicular to the surfaces 13 and 15 of the base 12. Recesses 36, 37 are defined at the top end 30 of the base 12 and transversely spaced from each other along the end surface 34. In the illustrated exemplary embodiment, each of the recesses 36, 37 is an aperture extending through the entire thickness of the base 12. Alternatively, the recesses may be formed in the surface 13 and not extend completely to the surface 15 of the base 12.

Further referring to FIG. 3, the bottom end 32 includes a transversely extending end surface 52, which also desirably is perpendicular to the surfaces 13 and 15. Alignment and engagement tabs 50, 51 project longitudinally away from the bottom end 32 and are transversely spaced from each other along the end surface 52. The tabs 50, 51 terminate at a point which is a greater distance from the top end 30 than the end surfaces 72, 74 of the respective sides 14, 16 at the bottom end 32. The tabs 50, 51 have a size and shape that is the same or substantially the same as the size and shape of the recesses 36, 37, respectively. In addition, the tabs 50, 51 are longitudinally aligned with the recesses 36, 37, respectively. Further, the transverse spacing between the tabs 50, 51 is the same as the transverse spacing between the recesses 36, 37.

In accordance with an aspect of the present invention, the shape of the tabs and recesses of the track 10 is adapted such that, when the tabs or recesses of a first track 10 are mated with corresponding recesses or tabs, respectively, of a second track 10, which includes recesses and tabs having, in addition to the same shape and size, the same transverse spacing and longitudinal alignment as the recesses and tabs of the first track 10, the first and second tracks are loosely engaged with each other in addition to being longitudinally aligned with each other. The mating of a tab of the first track with a recess of the second track occurs when the tab of the first track is disposed substantially or completely within the corresponding recess of the second track. The loose engagement of the two tracks with each other, obtained by the mating of the corresponding tabs and recesses, provides that one of the tracks cannot move or be moved longitudinally away from the other track. After mating of the tabs and the corresponding recesses of two respective tracks to loosely engage and longitudinally align the two tracks with each other, the two engaged tracks can be disengaged from each other by moving one track in a direction substantially perpendicular to the front or back surface of the base of the other track.

For example, if neither of two tracks engaged in accordance with the invention are affixed to a surface, such as a wall surface, and a force directed along the longitudinal length of the tracks is applied to or acts on one end of either of the two engaged tracks, the two tracks remain in loose engagement with each other. The longitudinal force would cause the engaged tracks to move together in the direction of the force, but would not cause the tracks to become disengaged from each other. Alternatively, if one of two tracks engaged in accordance with the invention is affixed to a surface, one of the two engaged tracks would not move longitudinally relative to the other, if a longitudinal force directed away from the track affixed to the surface is applied to or acts on the other track.

In one embodiment of the inventive track 10, the base 12 of the track 10 defines apertures 60 which are adapted to receive screws therethrough for securing the track 10 to another surface, such as a wall.

Figure 2:
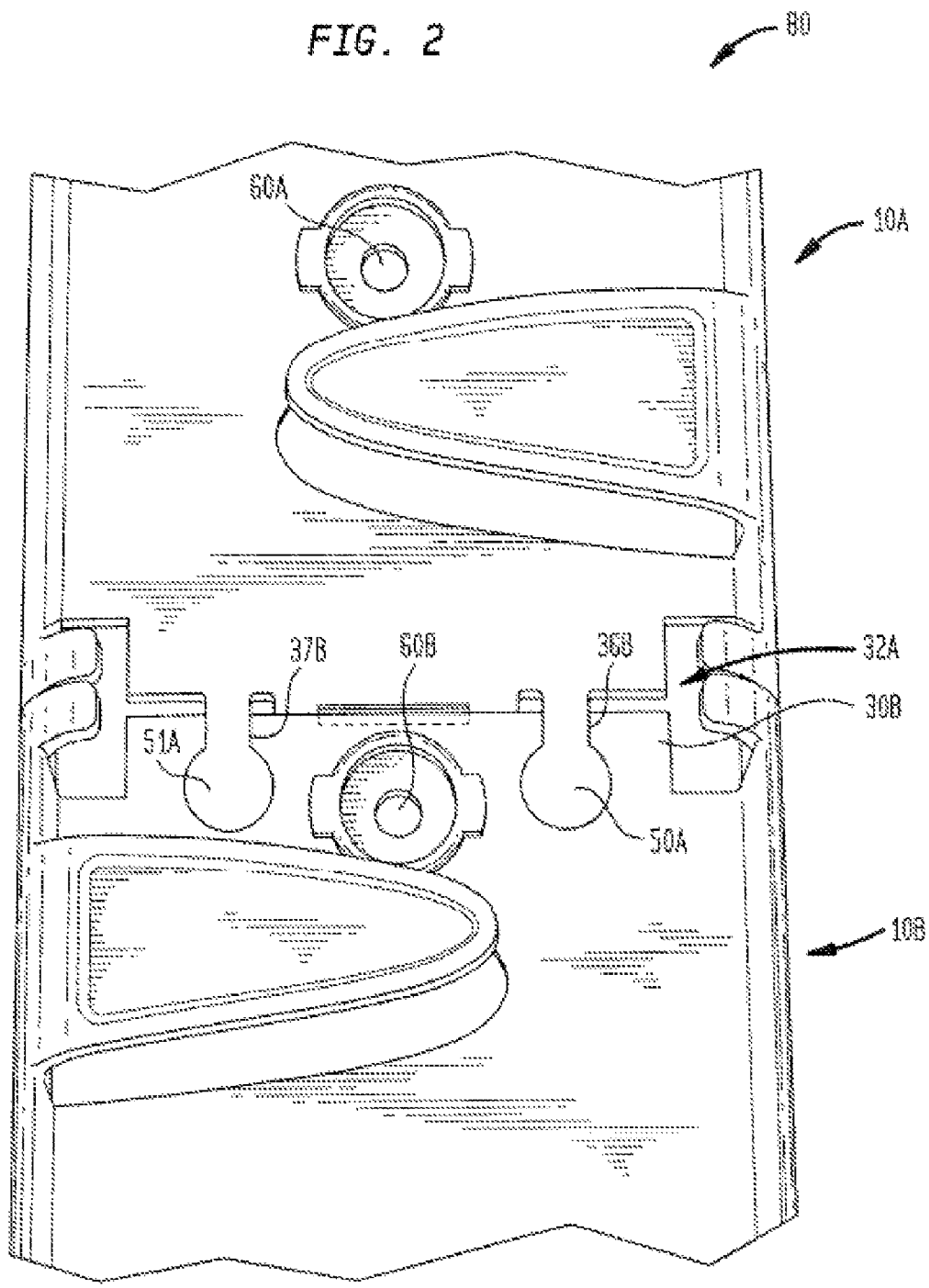
FIG. 2 is front perspective view of exemplary tracks adapted to hold cables and engaged with each other in accordance with an aspect of the present invention.

FIG. 2 illustrates an exemplary embodiment of a cable management system 80, in accordance with an aspect of the invention, including at least two tracks 10A, 10B. The tracks 10 are connected to each other, with the top end of one track engaged with the bottom end of the other track, to provide that a length of cables equal or slightly greater than the combined longitudinal length of the connected tracks can be retained by the tracks of the system 80. Referring to FIG. 2, the top end 30B of the track 10B is connected to the bottom end 32A of the adjacent track 10A by placing the tabs 50A, 51A of the track 10A within the corresponding recesses 36B, 37B of the track 10B, respectively. When the tabs have been placed within the corresponding recesses, such that the tabs are mated with the recesses, the tracks 10A, 10B are loosely engaged as well as longitudinally aligned with each other. The tracks 10A, 10B would remain in longitudinal alignment and loosely engaged with each other, so long as the tabs of the track 10A are mated with the corresponding recesses of the track 10B.

In a desired installation of the cable system 80, the tracks 10A, 10B are to be affixed to a wall with the track 10A positioned vertically above the track 10B. The ability to loosely engage the track 10A with the track 10B, by mating the tabs of the track 10A with the recesses of the adjacent track 10B, simplifies and eases the procedure for affixing the tracks 10A and 10B to the wall surface in longitudinal alignment with each other. Initially, the track 10A is affixed to a desired position on a vertical wall by inserting a screw or other securing means through the aperture 60A. Alternatively, the track 10A can be affixed to the wall with double sided mounting tape, wood nails, masonry nails or hook and loop fasteners. After the track 10A is affixed to the wall, such that the track 10 cannot move with respect to the wall, the track 10B is positioned by a user vertically below the track 10A and spaced from the wall. The position of the track 10B with respect to the wall is then vertically and horizontally adjusted by the user, so that the recesses 36B, 37B are vertically and horizontally aligned with the tabs 50A, 51A, respectively. Then, while maintaining the vertical and horizontal alignment of the tabs with the corresponding recesses, the track 10B is moved horizontally toward the wall, such that the tabs 50A, 51A are placed into, and thus mate with, the recesses 36B, 37B, respectively.

When the tabs of the track 10A are mated with the corresponding recesses in the track 10B, the track 10B is longitudinally aligned and also loosely engaged with the adjacent track 10A. In such engaged condition of the tracks 10A, 10B, the track 10B is loosely held vertically below the track 10A, in longitudinal alignment with the track 10A, without a user having to hold onto the track 10B with his hand or hands. Thus, by mating the tabs of the track 10A, which has already been affixed to the wall, with the corresponding recesses of the track 10B, which has not yet been affixed to the wall, the track 10B is engagingly connected with the track 10A so that the track 10B loosely hangs from and is in longitudinal alignment with the track 10A, without the user needing to hold the track 10B against the wall. While the track 10B loosely hangs from the track 10A, the track 10B can then be affixed to the wall surface, in longitudinal alignment with the track 10A, with precision and quickly by the user, simply by the user inserting a screw through the aperture 60B. The user, thus, can affix the track 10B to the wall surface vertically below and in longitudinal alignment with the track 10A, without the user having to hold the track 10B against the wall, so as to maintain the track 10B in proper longitudinal alignment with the track 10A, while the user is affixing the track 10B to the wall surface by inserting a screw into the aperture 60B.

Referring to FIG. 1, in an exemplary embodiment of the present invention, the recesses 36, 37 of the track 10 include a neck 38 extending away from the end surface 34 toward the bottom end 32, and a holding portion 40 extending from the neck 38 also toward the bottom end 32. The neck 38 can be in the form of a rectangular strip whose longer dimension extends along the longitudinal length of the track 10. The holding portion 40 has the shape of a circle and is defined by walls 42A, 42B that taper away from the neck portion 38 toward the sides 14, 16 and the bottom end 32, and then taper back toward each other, such that the walls 42A, 42B join. The diameter of the circular holding portion 40 defines a transverse dimension or width of the holding portion that exceeds the maximum transverse dimension or width of the strip 38. As the width of the holding portion 40 exceeds the maximum width of the strip 38, when the recesses 36, 37 are mated with correspondingly shaped and sized tabs of another track, the tracks are loosely engaged with each other and do not become disengaged from each other in the presence of a force directed along the longitudinal length of the engaged tracks.

Referring to FIGS. 1 and 3, the tabs 50, 51 of the track 10 include a neck portion 54 and a held portion 55 having the same size and shape as the neck 38 and the holding portion 40, respectively, of the recesses 36, 37. In a further aspect of the invention, the tabs 50, 51 include a weakened portion 70, such as a V-shaped groove, extending transversely across the neck portion 54. The groove 70 provides that the tab can be easily removed by a user from the track, without using tools, by bending the tab toward or away from the base 12, such that the tab breaks off the base 12 at the groove 70. For example, when several tracks 10 are connected with one another in a chain extending vertically along a wall, the tabs of a track on an end of the chain, such as the top-most track in the chain, has no useful function. Removal of the tabs from the top-most track of the chain is desirable, for example, when the covers in the chain have the same longitudinal length as the tracks they cover.

In an alternative embodiment, the system 80 can include a plurality of tracks 10A connected in sequence with each other, where the tabs at one end of a track 10A are mated to corresponding recesses of an adjacent track 10A in the sequence. In a further embodiment, the system 80 can include a plurality of tracks 10B connected in sequence with each other, where the tabs at one end of a track 10B are mated to corresponding recesses of an adjacent track 10B in the sequence.

In accordance with another aspect of the invention, a cable management system 100 includes a plurality of track units, where at least one of track units includes a track and a corresponding cover and at least one of the track units is an adjustable track unit. The adjustable track unit has a cover for covering a single or plurality of tracks, and can be manipulated, without the use of tools, to adjust the longitudinal length of a series of, or alternatively a chain of interconnected, track units of the system 100 that extend end-to-end in longitudinal alignment with one another. In an alternative embodiment of the system 100, a string of track units can include longitudinally aligned track units including an adjustable track unit, where at least one of the track units of the system abuts but is not connected to an adjacent track unit in the string.

Referring to FIGS. 4-7, in an exemplary embodiment the system 100 includes a track unit 110 and an adjustable track unit 112. The track unit 110 includes a track 120 and a cover 122, each desirably made of a slightly flexible material, such as plastic. The longitudinal length of the track 120 and the cover 122 are the same, and the cover 122 is adapted to fit over and engage with the track 120. The track 120 can have a construction similar or identical to the track 10 discussed above, and includes recesses (not shown in FIG. 5) at an end 110A and tabs 126 at an opposing end 110B. The track 120 further includes outer grooves 128, 130 in parallel opposing sides 14A, 16A, respectively. The grooves 128, 130 extend to the surface 15 of the base 12 and longitudinally along the length of the track 120. The transverse distance between the portions of the outer surfaces of the sides 14A, 16A immediately adjacent to the grooves 128, 130 exceeds the transverse distance between the outer surfaces of the grooves 128, 130.

The cover 122 includes a top surface 140 and opposing parallel sides 144, 146. The sides 144, 146 include inner lips 148, 150, respectively, extending longitudinally along the length of the cover 122. The transverse distance between the inner surfaces of the lips 148, 150 of the cover 122 is about equal to the transverse distance between the outer surfaces of the grooves 128, 130 of the track 120.

To engage the cover 122 with the track 120, the sides 144, 146 of the cover 122 can be positioned above and aligned with the sides 14, 16, respectively, of the track 120 and then the cover 122 can be moved toward the base 12 of the track 120. The inner lips 148, 150 of the cover 122, while moving over the sides 14, 16, would be flexed so that they are slightly further apart from each other than when the lips 148, 150 are in a non-flexed position, and then would return to the non-flexed position when they are received in the grooves 128, 130 of the sides 14A, 16A, respectively. The cover 122, thus, snaps into engagement with the track 120 when the lips of the cover clear the sides 14, 16 and are received in the grooves of the track 120. After the lips 148, 150 are received within the grooves 128, 130, the lips 148, 150 are slidable longitudinally along the grooves 128, 130, such that the cover 122 is slidable longitudinally in relation to the track 120. The cover 122 desirably is slid in relation to the track 120 so that the cover 122 covers the entirety of the track 120, thereby hiding cables being retained by the track 120.

Alternatively, the cover 122 can be engaged with the track 120 at one end of the track 120, such as the end 110B, by longitudinally aligning the lips 148, 150 with the grooves 128, 130, respectively, and then sliding the cover 122 longitudinally over the track 122, such that the lips 148, 150 are received in the grooves 128, 130. In the assembled condition of the track unit 110 with the cover 122 engaged with and covering the entirety of the track 120, the track unit 110 has a width defined by the transverse distance between the outer surfaces of the sides 144 and 146.

The adjustable track unit 112 includes a track 141 and a cover 142, each also made of flexible material. The longitudinal length of the track 141 is less than that of the cover 142 and also less than that of the track 120. The cover 142 has a longitudinal length relatively longer than the longitudinal length of the track 141. The track 141, for example, can have the same or similar construction as the track 120, and include recesses 143 at one end and tabs 146 at an opposing end. The recesses 143 are sized, shaped, transversely spaced and positioned at the end of the track 141 to be mateable with the corresponding tabs 126 of the track 120, in a manner similar to that described above for engaging the tracks 10A and 10B to each other by mating the tabs of the track 10A with the corresponding recesses of the track 10B.

Further, the track 141, like the track 120, includes outer grooves 155, 157 in parallel opposing sides 14B, 16B, respectively, extending longitudinally along the length of the track 141. The track 141 has a width defined by the transverse distance between the outer surfaces of the sides 14B and 16B.

The cover 142 includes a top surface 160 and parallel opposing sides 164, 166 having inner lips 168, 170, respectively, which extend longitudinally along the length of the cover 142. The cover 142 is adapted to be engageable with and fit over the track 141, and be slidable longitudinally in relation to the track 141, in the same manner that the track 120 and the cover 122 are engageable and slidable in relation with each other as described above. Further, the cover 142 is adapted to fit over the cover 122, such that the cover 142 can slide longitudinally in relation to and fit over the cover 122. In the illustrated embodiment, the transverse distance between the lips 168, 170 of the cover 142 is substantially equal to or slightly greater than the transverse distance between the outer surfaces of the cover 122 which would face the lips 168, 170 when the cover 142 is positioned over the cover 122. Consequently, when the cover 142, which is fitted over and engaged with the track 141, is slid over the cover 122 of the track unit 110, which is fitted over and engaged with the track 120, the lips 168, 170 of the cover 142 contact the opposing outer surfaces of the sides 144, 146 of the cover 122 to provide for at least partial engagement of the cover 142 with the cover 122.

In the exemplary installation of the system 100 where the units 110 and 112 are attached to each other and a wall surface, a longitudinal portion of the cover 142 can be fitted over a longitudinal portion of the cover 122, such that the cover 142 completely encloses the portion of the cover 122, thereby hiding the portion of the cover 122 from view. In a further embodiment, the cover 142 can enclose a portion of the cover 122, the entirety of the track 141 and a portion of wall surface adjacent to and in longitudinal alignment with an end of the track unit 112 opposite the end 110B of the track 120.

Figure 5:
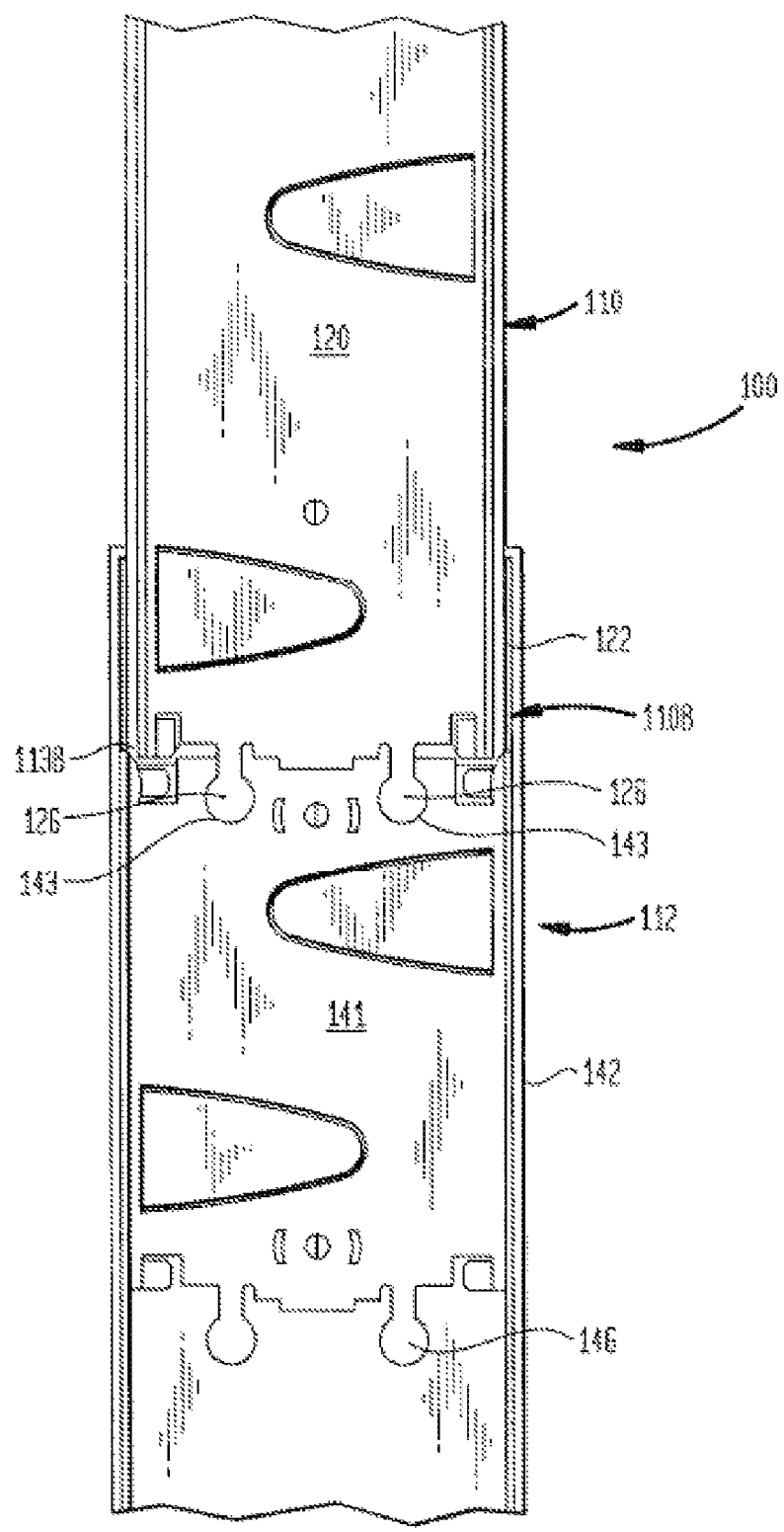
FIG. 5 is a bottom view of a portion of the system of FIG. 4.
Figure 6A:
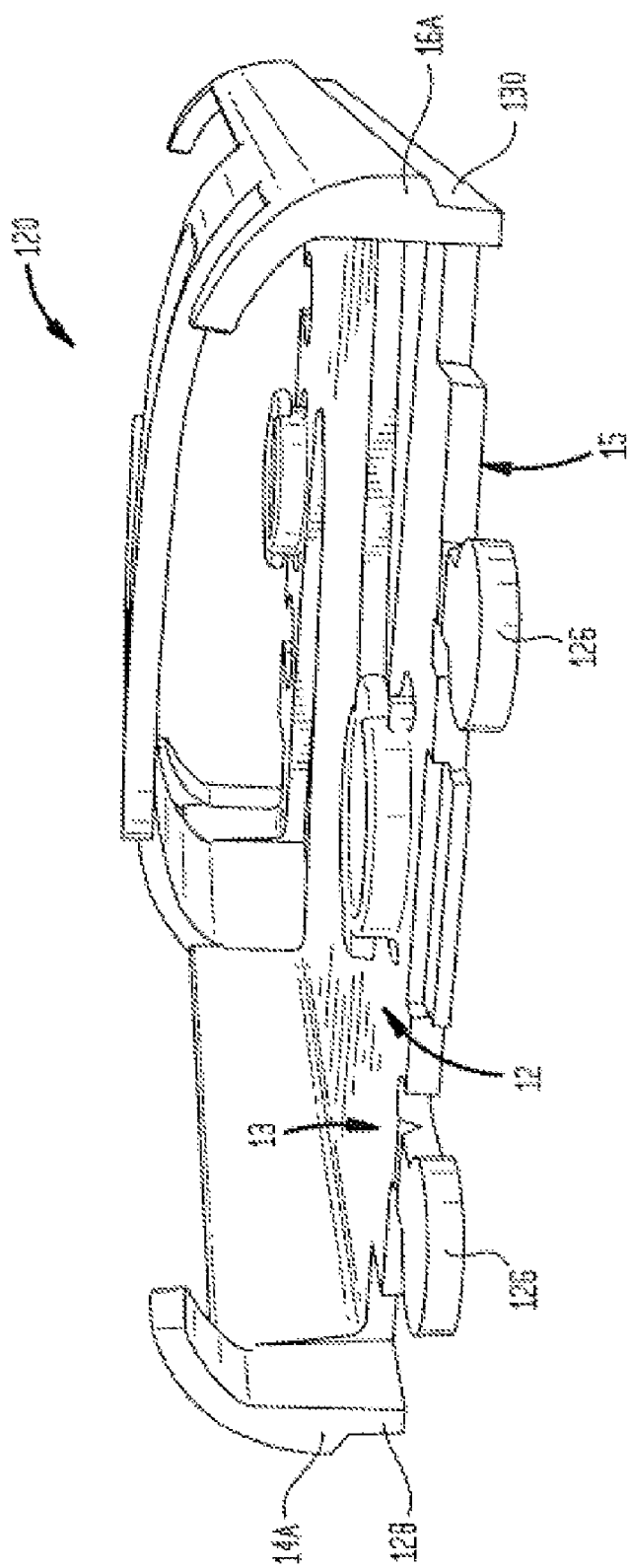
FIGS. 6A and 6B are perspective views of exemplary tracks of the system of FIG. 4.
Figure 6B:
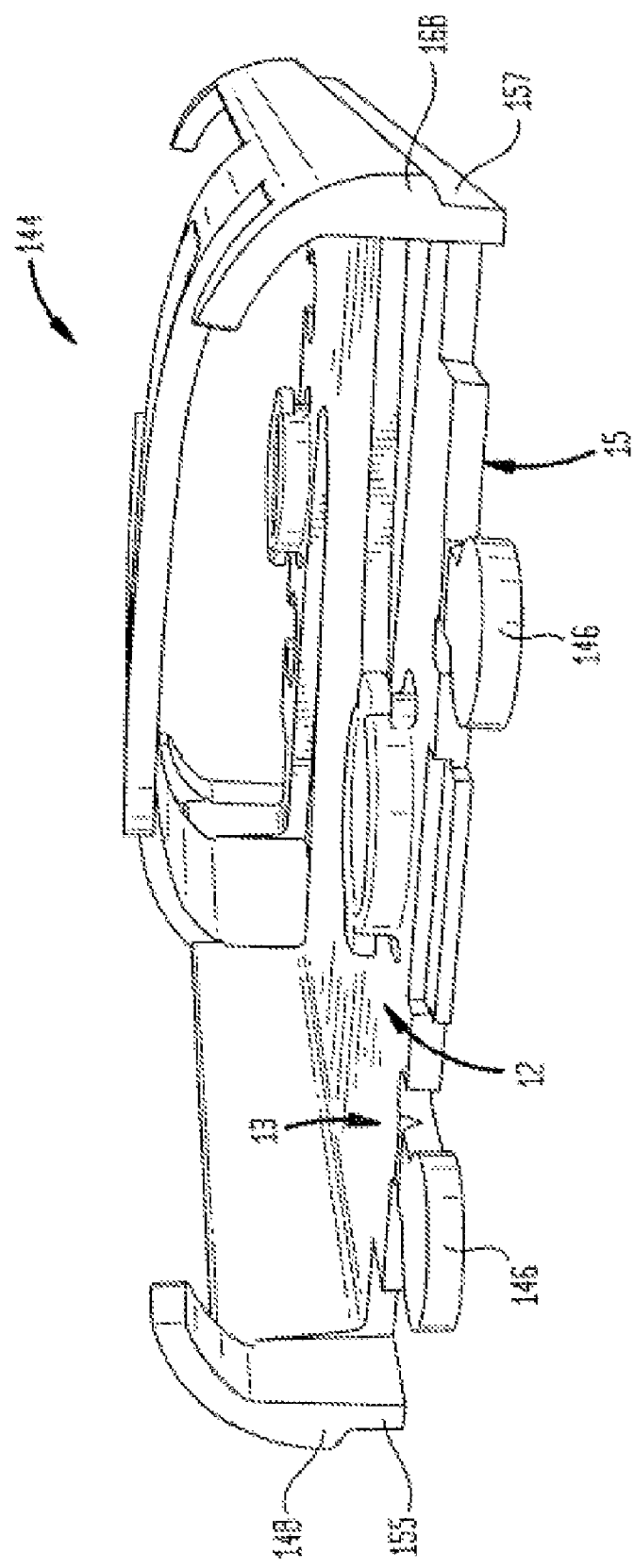

Referring to FIG. 5, in an exemplary embodiment of the system 100, it is assumed that the track units 110 and 112 are affixed to a wall surface. The track unit 110, whose cover 122 is fitted over the track 120 to cover the entirety of the track 120, is engaged with the track unit 112, based on mating of the tabs 126 of the track 120 with the corresponding recesses 143 of the track 141. The cover 142, which is fitted over the track 141 and slidable longitudinally in relation to the track 142 and over the cover 122 of the track unit 110, encloses a longitudinal portion of the track unit 110, the entirety of the track 141 and a portion of the wall surface longitudinally aligned with the track 141 and extending away from the end of the track 141 opposite the track 120. The cover 142, whose top 160 has an outer surface desirably similar in configuration as the outer surface of the top 140 of the cover 122, blends in an aesthetically pleasing fashion with the cover 122.

Advantageously, the cover 142 can be positioned in relation to the cover 122 so a desired longitudinal length of the cover 142 extends away from the track 141, at either or both longitudinal ends of the track 141, and covers the cover of an adjacent track unit attached to the track 141, while the cover 142 still covers the entirety of the track 141. Therefore, a user would not need to cut the cover and/or a track of a track unit of the system 100 to obtain a desired longitudinal length of interconnected track units. In comparison, in known prior art cable management systems, each of the track units includes a cover having the exact longitudinal length of the track with which the cover is paired. Consequently, to obtain a longitudinal length of interconnected track units that is shorter than the combined longitudinal length of the track units of a prior art system that can be used to form a chain of interconnected track units, both the track and the cover of a track unit would need to cut. For example, in the prior art, if a five foot, five inch longitudinal length of interconnected track units was desired, and the available track units of the prior art system included pairs of tracks and covers that each is 1 foot or six inches long, the cable management system that would be formed likely would include five, one foot long track units attached to each other end-to-end in a chain and one six inch track unit attached to one end of the chain, where the cover and track of the six inch track would be cut one inch shorter to obtain the desired length.

In desired embodiments of the system 100, an adjustable track unit may have tracks of various lengths, and the available lengths of the track are (i) less than the length of a track of a track unit of the system 100 whose cover has a length that is the same as the track it covers, and (ii) less than the length of the cover that can be paired with the track of the adjustable track unit.

Figure 4:
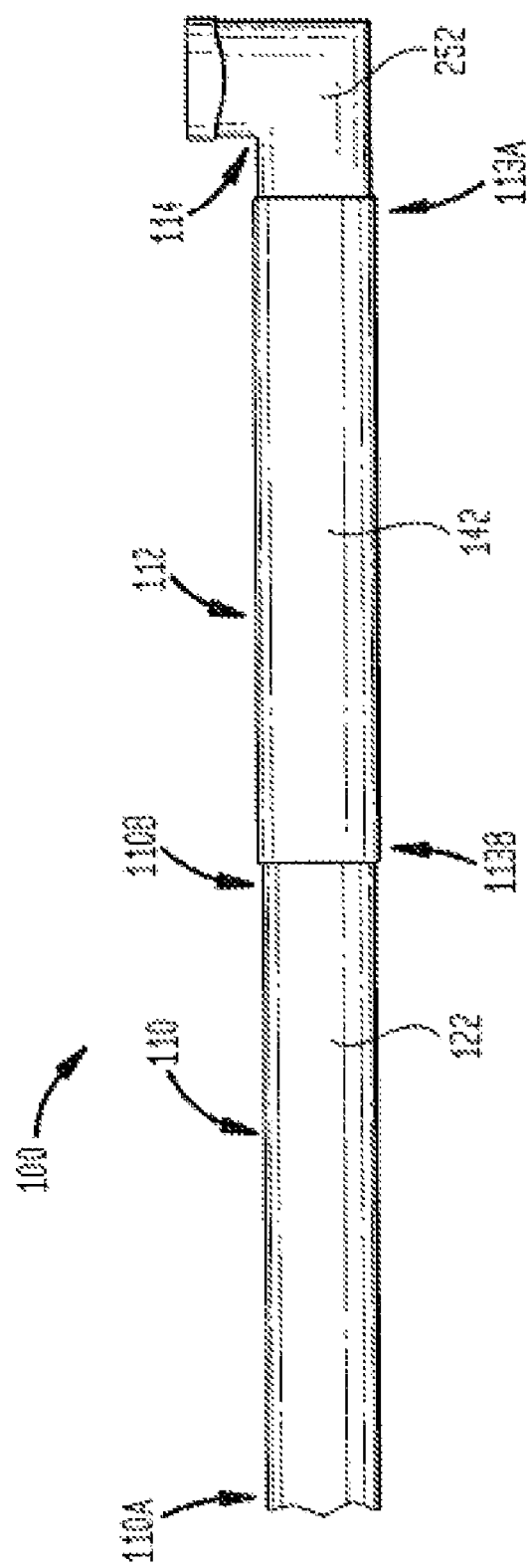
FIG. 4 is a perspective view of an exemplary cable management system in accordance with an aspect of the invention.
Figure 8A:
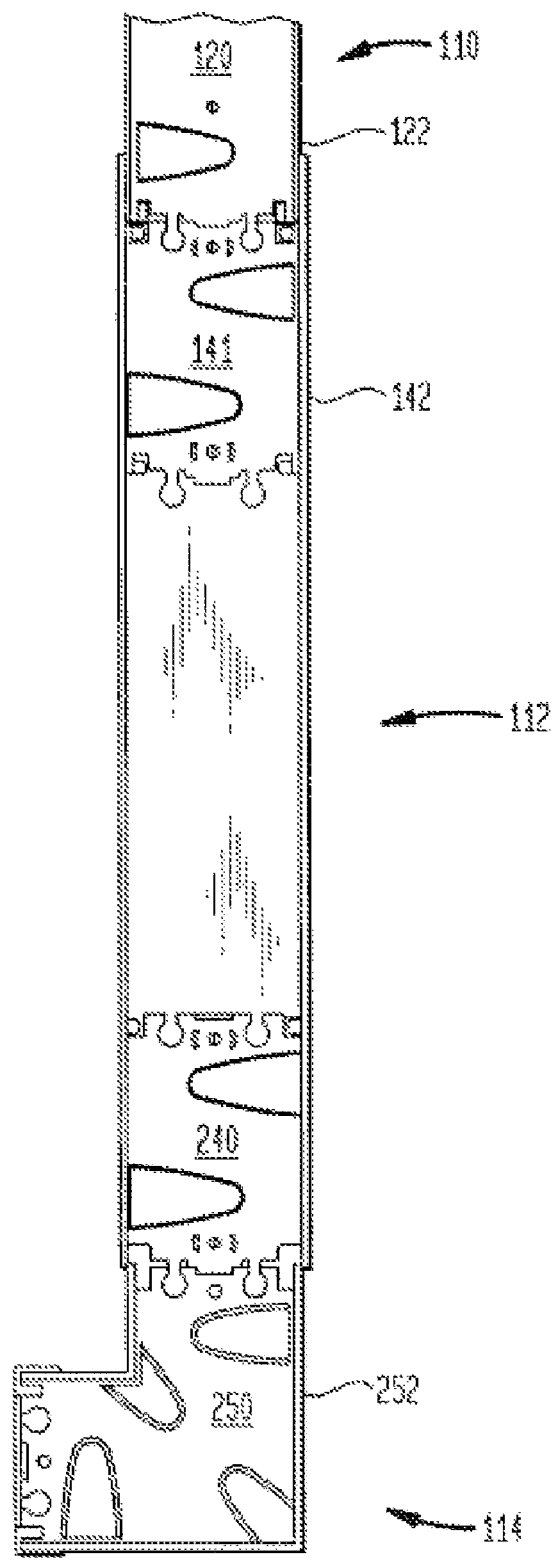
FIG. 8A is bottom view of the system of FIG. 4

In a further embodiment, referring to FIGS. 4, 8A and 8B, the system 100 includes a track unit 114, desirably in the shape of an elbow, attached to the track unit 112. The elbow track unit 114 includes a track 250 and a cover 252. The track 250 includes a longitudinally extending portion 254 having opposing ends 255 and 257, and a longitudinally extending portion 256 having opposing ends 259 and 261. The portions 254 and 256 have the same width as, and include grooves extending along outer sides as in, the track 120. Further, the portions 254 and 256 are orthogonal to each other. The ends 255 and 259 define recesses 262 and 264, respectively, as in the track 10. In an alternative embodiment, the ends 255 and 259 each may define tabs, or recesses and tabs, respectively, as in the track 10. The track 250 further includes an interconnecting portion 258, which is in the shape of a square or rectangle and interconnects the ends 257 and 261 to each other. The interconnecting portion 258 includes outer sides along which grooves extend, similarly as in the track 10 or track 120.

The cover 252, like the cover 122, includes sides with inner lips which are adapted to engage with the grooves in the track 250, such that the cover 252 can be fitted over and engaged with the track 250. Unlike the covers of the tracks 120 and 122, the cover 252 can be engaged with the track 250 only in a single position where the cover 252 encloses the entirety of the track 250.

In another embodiment, the interconnecting portion 258 may have any shape, such as a curved or elbow shape.

Referring to FIGS. 8A and 8B, the track unit 112 further includes a track 240 at end 113A, which is opposite end 113B where the track 141 is attached to the track 120 of the track unit 110. The track 240 has a construction and size similar to the track 141, and includes recesses at the end facing the track 141 and tabs 243 on the opposite end. The track 240 is attached to the track unit 250 by mating of the tabs 243 with the corresponding recesses 262 in the end 254. The cover 142 extends over the tracks 141 and 240, which are longitudinally spaced from each other, and depending upon the placement of the tracks 141 and 240 in relation to each other, the longitudinal lengths of the tracks 141, 240 and the longitudinal length of the cover 142, can also extend over a portion of the cover 252 and a portion of the cover 122. Thus, the elbow track unit 114 provides that, where it is necessary to route cables in a first direction and then a second direction, such as orthogonal to the first direction, the cables can be readily retained and routed within a chain of interconnected, or alternatively a series of unconnected, track units of a cable management system, where one segment of the chain or series, which may contain one track unit or two or more longitudinally aligned track units, is not in longitudinal alignment with another segment of the chain or series.

In an alternative embodiment of the system 100 including the elbow unit 114, the track unit 112 can be omitted and, instead, the track 120 can be attached at end 110B directly to the portion 254.

In still another embodiment of the system 100, the track 250 of the track unit 114 can have the same construction, width and length as the track 120 of the track unit 110 or the track 240 of the track unit 112, and the track 250 can be connected to the track 240 of the track unit 112 based on mating of corresponding tabs and recesses, similarly as described above.

Figure 14A:
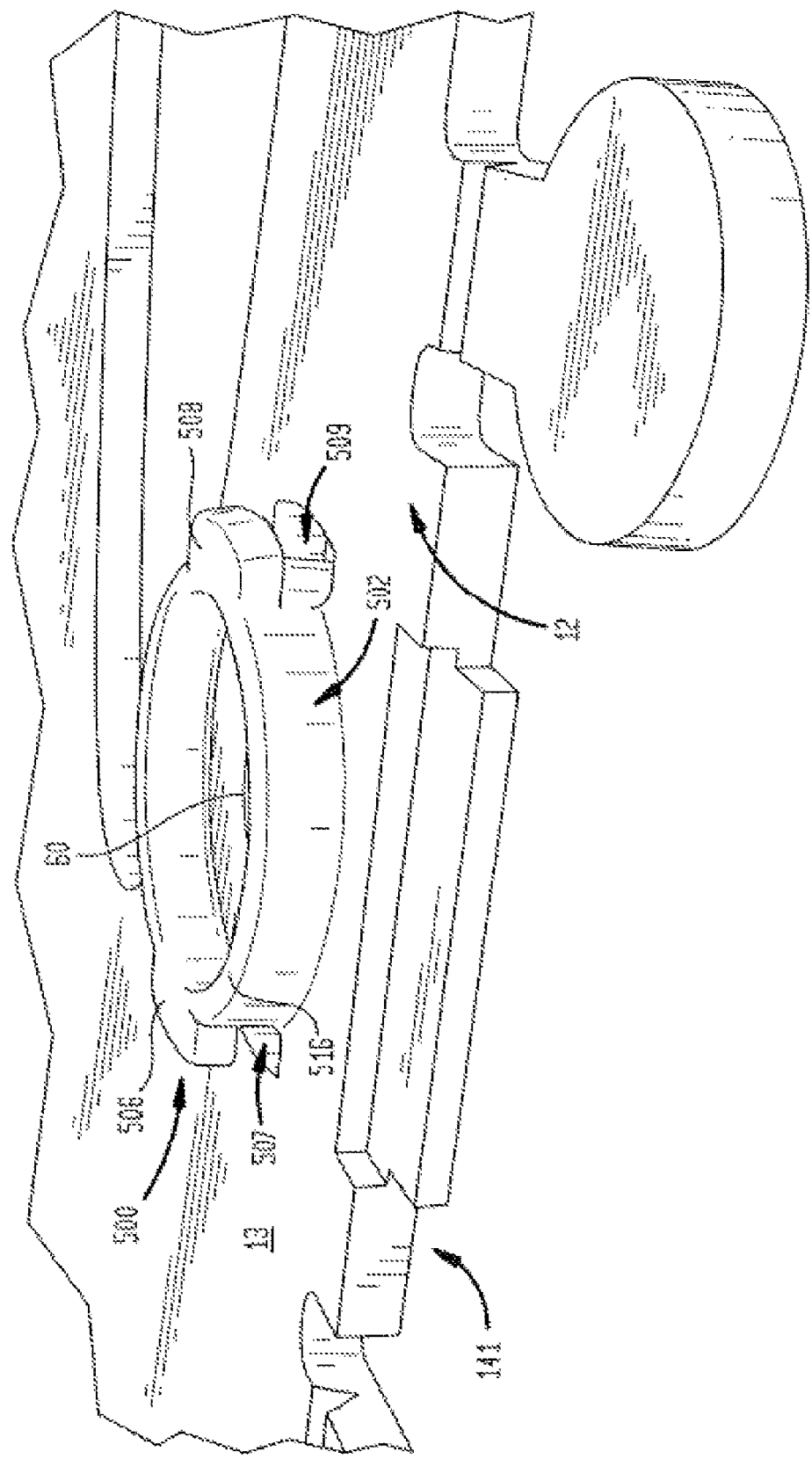
FIGS. 14A and 14B are end and side perspective views, respectively, of a portion of a track in accordance with an aspect of the invention.
Figure 14B:
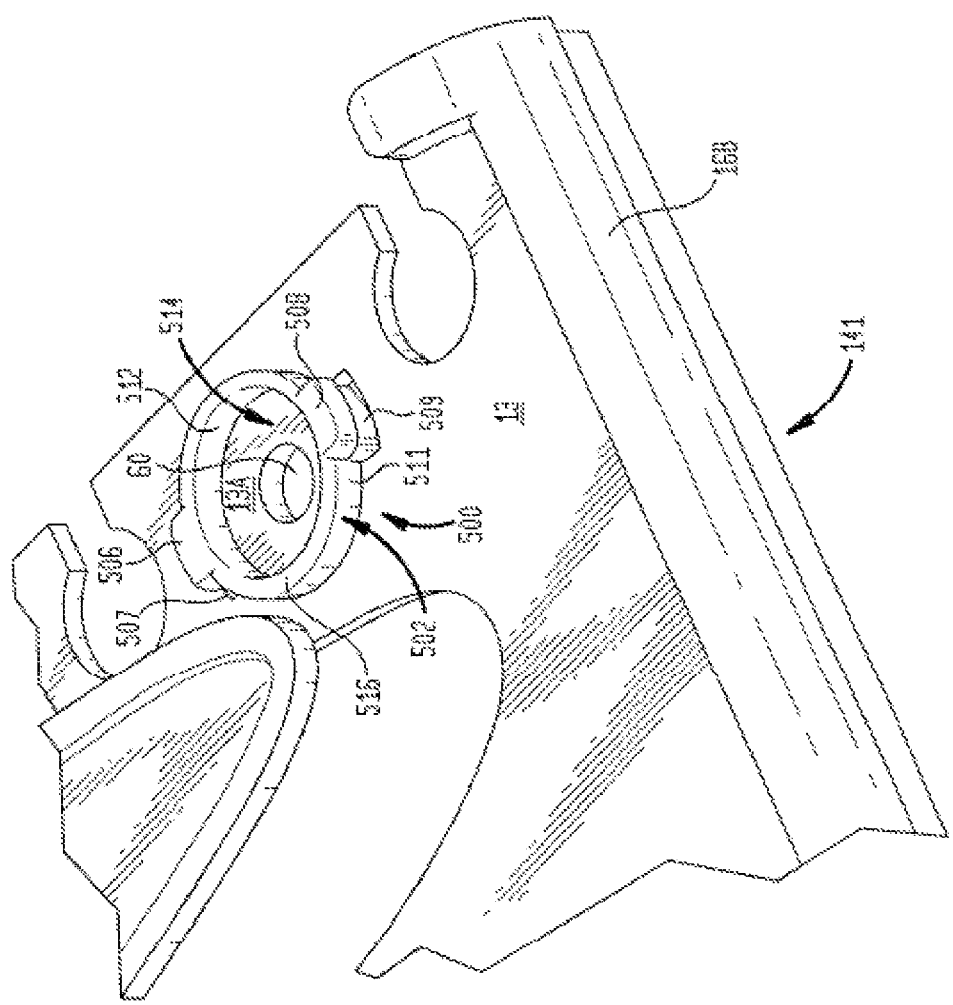

In a further aspect of the invention, the base of a track of a track unit, such as the base of the tracks 141 and 240 of the track unit 112 or of the track 120 of the track unit 110, includes a track alignment assembly. Referring to FIGS. 14A and 14B, in an exemplary embodiment the track 141 includes a track alignment assembly 500 having an annular barrel 502 extending away from the front surface 13 of the base 12 of the track 141. Opposing tabs 506 and 508 extend away from the barrel 502 and toward the respective opposing sides 14B, 16B of the track 141. The tabs 506, 508 are spaced from the surface 13, and together with outer annular surface 511 of the barrel 502 and the portion of the surface 13 opposing the tabs 506, 508, define gaps 507, 509, respectively.

It is to be understood that the track 141 can include a plurality of track alignment assemblies 500 whose respective gaps are longitudinally aligned with each other. Further, it is to be understood that a track alignment assembly 500 is positioned on a track of the inventive system, such that the assembly 500 on a first track is longitudinally aligned with the assembly 500 on a second track, when the first and second tracks are positioned in longitudinal alignment with each other.

In a further embodiment, as shown in FIGS. 14A and 14B, the barrel 502 desirably is centered about an aperture 60 in the base 12 of the track 141 and includes an annular interior surface 512. The interior surface 512 circumscribes a portion 13A of the surface 13. The interior surface 512 and the portion 13A define an interior region 514 for receiving a screw head of a screw that would be inserted into the aperture 60 to affix the track 141 to another surface, such as a wall. The interior surface 512 is adapted to project sufficiently above the surface 13 such that, when a screw (not shown) has been inserted into the aperture 60 and is securing the track 141 to the wall, the head of the screw is completely within the region 514 and, thus, does not extend from the surface 13A beyond the top surface 516 of the barrel 502.

Figure 15:
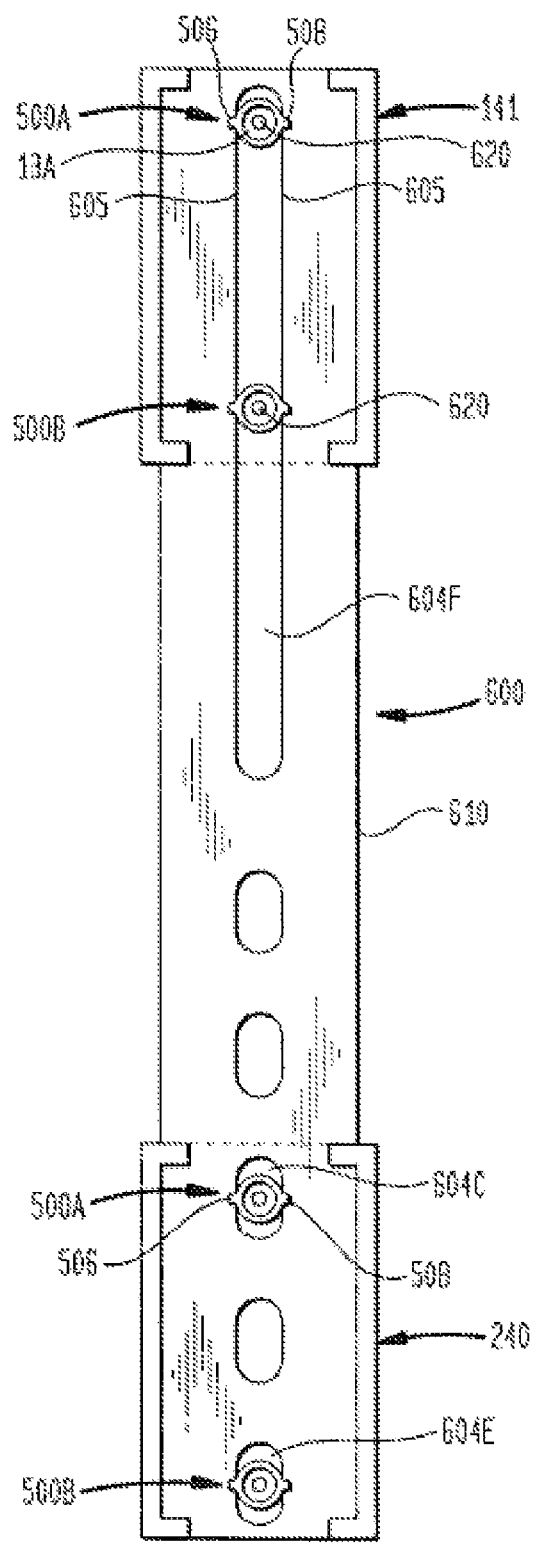
FIG. 15 is a front view of the alignment template of FIG. 13 coupled to track alignment assemblies, in accordance with an aspect of the invention.

Further referring to FIGS. 13 and 15, the alignment assembly 500 of a track can be used with an alignment template 600 to longitudinally align first and second tracks, which each include the assembly 500, with each other, when the first and second tracks are to be attached to a surface and are spaced longitudinally from each other. The template 600 includes a base 601, opposing, parallel longitudinally extending sides 603 and a series of longitudinally aligned slots 604 defined in the base 601. The slots 604 can include smaller sized slots 604A-E and an elongated slot 604F. Alternatively, the template 600 can include a series of holes instead of slots. The slots 604 are defined in part by opposing, parallel, longitudinally extending sides 605. The spacing between the opposing sides 605 is adapted so that the sides 605 can be received respectively within the gaps 507, 509 of the assembly 500 of the track 141. In a further embodiment, the template 600 is adapted so that the spacing between the sides 603 is substantially equal to the width of the track 141 defined between inner surfaces of the sides 14B, 16B adjacent the top surface 13 of the base 12. The template 600 with the slots 604 can be formed from die cut paper, cardboard, plastic or be molded from plastics.

In an exemplary installation of the tracks 141 and 240 to a wall surface where the tracks 141 and 240 would be spaced from each other such as illustrated in the system 100, the template 600 can be used to longitudinally align the tracks 141 and 240 to each other as follows. Referring to FIGS. 13, 14 and 15, the track 141 is affixed to a wall surface by inserting screws into the apertures 60 and turning the screws until screw heads 620 contact the surface portion 13A and the bottom surface 15 of the track 141 is contacting the opposing wall surface. The screws are selected such that the height of the screw head does not exceed the distance between the top surface 516 of the barrel 502 and the surface 13. The screw heads, thus, are contained completely within the interior region 514, such that contact between cables retained by the track 141 and the screw heads 620 is avoided.

After the track 141 is affixed to the wall surface, the template 600 is moved in relation to the track 141, so that the sides 605 of the slot 604F are positioned within the gaps 507, 509 of the two longitudinally aligned assemblies 500A, 500B. The tabs 506, 508 are adapted to snap over the sides 605 of the slots 604 when the template 600 is maneuvered to position the sides 605 within the gaps of the assemblies 500. Then, the track 240 is maneuvered so that the portions of the sides 605 of the template 600 defining the slots 604C and 604E are received in the gaps defined by the assemblies 500A and 500B, respectively, of the track 240. The track 240 is then affixed to the wall using screws, similarly as described above for the track 141, while the sides 605 of the template 600 opposite the assemblies 500 of the tracks 141 and 240 are within the respective gaps, thereby longitudinally aligning the tracks 141 and 240.

The template 600 and the assemblies 500 of the track 141 and 240, thus, advantageously provide that the track 240, when spaced from the track 141 as in the system 100, is longitudinally aligned with the track 141 when the tracks 141 and 240 are attached to the wall surface, such that the cover 142 can be fitted over and engaged with both of the tracks 141 and 240 after the tracks are affixed to the wall surface. As is readily evident, if the tracks 141 and 240, which are spaced from and therefore not connected to each other as in the system 100, are not attached to the wall surface in substantial longitudinal alignment with each other, the cover 142 cannot be fitted over both of the tracks 141 and 240.

In an alternative embodiment, the template 600 is maneuvered in relation to the tracks 141 and 240, for longitudinally aligning the tracks 141, 240 with each other when the tracks 141, 240 are affixed to a wall surface, by placing the sides 603 of the template in contact with the opposing inner surfaces of the sides 14, 16 of the tracks 141, 240.

Referring to FIG. 11, in accordance with another aspect of the invention, a cable management system 100A includes a cap 300 for installation at an open end of a track unit, to which another track unit is not connected, for strengthening the engagement of the cover with a track of the track unit at the open end. The cap 300, when installed at the open end of the track unit, can strengthen and support the previously engaged track and cover of the track unit at the open end, thereby avoiding the cover from becoming inadvertently disengaged from the track of the track unit.

FIGS. 9-10 illustrate an exemplary cap 300 for installation at open end 350 of the adjustable track unit 112 of the system 100A. Referring to FIG. 11, the system 100A, similar to the system 100, includes the track unit 110 connected to the track unit 112. The track unit 112 includes the cover 142, which would be engaged with and fitted over (i) the track 141, which is connected to the track 120 as in the system 100, and (ii) the track 240, which is spaced from the track 120 as in the system 100. The system 100A, however, does not include an elbow track unit or any other track unit connected at the end 113A of the track 240. Instead, the cap 300 terminates the open end 350 of the track unit 112.

Referring to FIGS. 9-10, the cap 300 includes a top cover 302 with opposing arcuate side walls 304, 306 and a back wall 308 extending away from the sides 304, 306 and the top cover 302. The back wall 308 shares common planar bottom surfaces 305, 307 with the respective side walls 304, 306. The cover 302, the sides 304, 306 and the back wall 308 define an interior region 310 of the cap 300. The back wall 308 includes a portion 312 extending from the side wall 304 and a portion 314 extending from the side wall 306. A flange 316, which in part forms the bottom surface 307, extends orthogonally away from the wall portion 314 into the region 310. The flange 316, the opposing side wall 306 and the back wall portion 314 define a receiving region 320. The region 320 has a length L equal to the longitudinal distance the flange 316 extends from the wall portion 314, and a width W that is a function of the transverse distance between the side wall 306, which in the illustrated embodiment is arcuate in shape, and the flange 316. Similarly, a flange 318, which in part forms the bottom surface 305, extends orthogonally away from the wall portion 312 into the region 310. The flange 318, the side wall 304 and the back wall portion 312 define a receiving region 322 having the same length and width as the region 320.

Referring to FIGS. 11 and 12, at the open end 350 of the track unit 112, base 412 of the track 240 includes cut outs 290, 291 that define end projections 449, 451 of respective opposing sides 448, 450 of the track 240. The end projections 449, 451 have a longitudinal length at least equal to L. Further referring to FIG. 7B, the sides 164, 166 of the cover 142 terminate in end portions 469, 471, respectively.

In accordance with the present invention, the end projections 449, 451 of the track 240 and the end portions 469, 471 of the sides 164, 166 of the cover 142 are adapted so that the projections 469, 449 and the end portions 471, 451 can fit within the respective regions 320, 322 and, when fitted within the regions, are held within the regions. In one embodiment, the regions 320, 322 are adapted such that, when the end portions of the cover 142 and the end projections of the track 240 are received therein, which can occur if the track 240 is engaged with the cover 142 as described above, the side and flange of the cap defining each receiving region impinges upon the adjoining projection and end portion of the track and cover, respectively, so as to engage and hold the adjoining projection and end portion within the region. The cap, by engaging an adjoining projection and end portion of the track and the cover within a receiving region, strengthens the engagement between the cover and track when the cover is engaged with the track. Consequently, the use of the cap with the engaged track and cover of a track unit advantageously provides that a force greater than that required to engage the cover 142 with the track 240 would need to be applied to the cover 142 to cause the cover to become disengaged from the track 240.

Referring to FIGS. 9 and 11-12, to install the cap 300 at the open end 350 of the track unit 112, the cover 142 is engaged with the track 240 and the end projections 449, 451 of the track 240 and the end portions 469, 471 of the sides 164, 166 are arranged substantially flush across the width of the track unit 112. The cap 300 is then positioned with the interior region 310 facing the end projections and the end portions, and then moved toward the track unit 112 so that the top cover 302 slides over the top 160, the sides 304, 306 slide respectively over the sides 164, 166 of the cover 142, and the flanges 318, 316 respectively enter the cut-outs 290, 291. The cap 300 is moved in direction of the end 113B, until the back wall portions 312 and 314 contact the respective end projection and end portion pairs. When the cap 300 cannot be moved further toward the end 113B, the cap 300 has been installed on the end 113A of the track unit 112. In the installed position, the flanges 316, 318 are in contact respectively with the projections 449, 451; the projections 449, 451 are respectively in contact with the lips 168, 170 of the cover 142; and the sides 304, 306 are respectively in contact with the facing surfaces of the sides 164, 166 of the cover 142. Thus, the cap 300, when installed on the open end 350 of the track unit 112, engages the ends of the cover and track of the track unit 112 within the respective receiving regions in a manner that strengthens the engagement between the track and cover at the open end 350. The strengthened engagement of the track and cover is achieved by simply sliding the cap 300 over the cover and track, and does not require the cap to be fastened with tools or a fastening device to a wall surface, the track or the cover. When installed on the track unit, the cap avoids the cover from becoming disengaged from the track if, for example, at a time subsequent to engagement of the track with the cover, the cables retained by the track are moved so as to apply a force to the cover in the direction away from the track.

In a desired embodiment of the system 100A, end portions of the tabs 243 of the track 240 at the end 113A of the track 240 are snapped off at weakened portions 243A, before the cap 300 is installed at the open end 350 of the track unit 112, such that the tabs 243 are not visible after the cap 300 is installed at the open end 350 on the track unit 112 which has been mounted on a wall surface.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A cable management system comprising:
first and second longitudinally extending tracks adapted for attachment to a surface, wherein the first track includes an alignment and engagement tab projecting from a first end of the first track and wherein the second track defines a recess at a first end of the second track adapted for mating with the tab of the first track, and wherein, when the tab of the first track is mated with the recess of the second track, the first track is engaged and longitudinally aligned with the second track and the engagement of the first track with the second track is maintained in the presence of a force acting along a longitudinal length of the first track or the second track, wherein the tab includes a first portion interconnecting a second portion to the first end of the track, wherein the first portion has a width extending transverse to a longitudinal dimension of the first track and the second portion has a width extending transverse to the longitudinal dimension of the first track exceeding the width of the first portion.

2. The cable management system of claim 1, wherein the first portion is rectangular in shape and the second portion is arcuate in shape.

3. The cable management system of claim 1, wherein the tab includes a weakened portion extending transversely to the longitudinal dimension of the first track.

4. The cable management system of claim 3, wherein the weakened portion includes a groove.

5. The cable management system of claim 1, wherein the second track includes an alignment and engagement tab projecting from a second end opposite the first end of the second track, wherein the tab at the second end of the second track includes a weakened portion extending transversely to the longitudinal dimension of the second track.

6. The cable management system of claim 1, wherein at least one of the first and second tracks includes a cable retention device.

7. A cap for a cable management system, wherein the cable management system includes a longitudinally extending track and a longitudinally extending cover engagable with and for fitting over the track, wherein the track includes a base with opposing first and second sides, wherein the first side of the base terminates as first and second projections of the first side of the base at respective longitudinal ends of the track and the second side of the base terminates as third and fourth projections of the second side of the base at the respective longitudinal ends of the track, wherein the cover includes a top with opposing first and second sides, wherein the first side of the cover terminates at first and second ends at respective longitudinal ends of the cover and the second side of the cover terminates as third and fourth ends at the respective longitudinal ends of the cover, the cap comprising:
- a top, a back wall and opposing first and second cap sides extending from the back wall, wherein the top, back wall and opposing cap sides define an interior region; and
- opposing first and second inner flanges extending from the back wall into the interior region and defining first and second receiving regions with the corresponding opposing first and second cap sides;
- wherein the first and second receiving regions are adapted for receiving and retaining therein, when the cover is engaged with and fitted over the track, the first end of the cover and the first projection of the track and the third end of the cover and the third projection of the track, respectively.

8. The cap of claim 7, wherein, when the first end of the cover and the first projection of the track and the third end of the cover and the third projection of the track are received in the first and second receiving regions, respectively, the first inner flange contacts the first projection, the first cap side contacts the first end of the cover, the second inner flange contacts the third projection and the second cap side contacts the third end of the cover, such that the cover and the track are engaged with the cap.

9. A cable management system comprising:
- a longitudinally extending track and cover, wherein the track includes a back wall and opposing sides extending from the back wall, wherein each of the sides of the track defines a longitudinally extending outer groove, wherein the cover includes a top with opposing sides, wherein each of the sides of the cover includes a longitudinally extending inner lip;
- wherein the cover and the track are adapted so that the cover fits over and engages with the track with the inner lips of the cover received within the respective opposing outer grooves of the track; and
- a cap including a cover having opposing side walls and opposing inner flanges between and spaced from the respective side walls, wherein the side walls and the inner flanges respectively define gaps therebetween,
- wherein the cap is adapted for fitting over and engaging with the track and the cover, such that longitudinal ends of the sides of each of the cover and the track are received and retained respectively in the gaps for strengthening the engagement of the cover with the track.

10. The cable management system of claim 9, wherein the cap is slidable over the longitudinal ends of the sides of the track and the cover for engagably receiving the longitudinal ends of the sides of the track and the cover respectively within the gaps.

11. The cable management system of claim 9, wherein the track includes a cable retention device.

* * * * *